United States Patent
Zhao

(10) Patent No.: US 8,135,753 B2
(45) Date of Patent: Mar. 13, 2012

(54) DYNAMIC INFORMATION HIERARCHIES

(75) Inventor: Mingyang Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/512,661

(22) Filed: Jul. 30, 2009

(65) Prior Publication Data

US 2011/0029489 A1     Feb. 3, 2011

(51) Int. Cl.
*G06F 7/00*     (2006.01)
*G06F 17/30*     (2006.01)
*G06F 12/00*     (2006.01)

(52) U.S. Cl. ......... 707/797; 707/803; 707/808; 707/829

(58) Field of Classification Search .................. 707/648, 707/732, 736, 793, 797, 802, 803, 807, 808, 707/829, 956
See application file for complete search history.

(56) References Cited

U.S. PATENT DOCUMENTS

| | | | |
|---|---|---|---|
| 5,734,887 A | 3/1998 | Kingberg et al. | |
| 6,202,062 B1 | 3/2001 | Cameron et al. | |
| 6,301,579 B1 * | 10/2001 | Becker | 1/1 |
| 6,374,263 B1 * | 4/2002 | Bunger et al. | 1/1 |
| 6,493,699 B2 * | 12/2002 | Colby et al. | 1/1 |
| 6,553,412 B1 | 4/2003 | Kloba et al. | |
| 6,785,768 B2 | 8/2004 | Peters et al. | |
| 7,051,038 B1 | 5/2006 | Yeh et al. | |
| 7,085,682 B1 | 8/2006 | Heller et al. | |
| 7,203,909 B1 | 4/2007 | Horvitz et al. | |
| 7,337,370 B2 | 2/2008 | Haynes et al. | |
| 7,340,472 B2 | 3/2008 | Makus et al. | |
| 7,389,305 B1 | 6/2008 | Kindig et al. | |
| 7,493,352 B2 | 2/2009 | O'Neil et al. | |
| 7,499,939 B2 | 3/2009 | Jandhyala et al. | |
| 7,673,340 B1 | 3/2010 | Cohen et al. | |
| 7,865,499 B2 * | 1/2011 | Schumacher | 707/711 |
| 7,895,191 B2 * | 2/2011 | Colossi et al. | 707/717 |
| 7,941,525 B1 | 5/2011 | Yavilevich | |
| 2002/0065912 A1 | 5/2002 | Catchpole et al. | |
| 2002/0099818 A1 | 7/2002 | Russell et al. | |
| 2002/0103798 A1 | 8/2002 | Abrol et al. | |
| 2002/0112048 A1 | 8/2002 | Gruyer et al. | |
| 2002/0169868 A1 | 11/2002 | Lopke et al. | |
| 2003/0028591 A1 | 2/2003 | Goloshubin et al. | |
| 2003/0084377 A1 | 5/2003 | Parks et al. | |
| 2003/0115189 A1 | 6/2003 | Srinivasa et al. | |
| 2004/0260715 A1 | 12/2004 | Mongeon et al. | |
| 2005/0210024 A1 | 9/2005 | Hurst-Hiller et al. | |
| 2005/0240580 A1 | 10/2005 | Zamir et al. | |
| 2006/0004711 A1 | 1/2006 | Naam | |
| 2006/0277205 A1 | 12/2006 | Song et al. | |

(Continued)

OTHER PUBLICATIONS

Rayner Alfred and Dimitar Kazakov (2007), Handling Datasets in a Multi-Relational Environment: Cluster Dispersion vs Cluster Purity, pp. 196-201.*

(Continued)

*Primary Examiner* — Don Wong
*Assistant Examiner* — Merilyn Nguyen
(74) *Attorney, Agent, or Firm* — Merchant & Gould P.C.

(57) ABSTRACT

A dynamic information hierarchy may be provided. Logging data comprising a captured user event and a component ID associated with a hierarchical node may be stored in a raw data table. The stored data may be aggregated across the nodes of the hierarchy, stored in an aggregation table, and provided to a user in a report.

14 Claims, 5 Drawing Sheets

U.S. PATENT DOCUMENTS

| | | |
|---|---|---|
| 2007/0121626 A1 | 5/2007 | Shepard |
| 2007/0208730 A1 | 9/2007 | Agichtein et al. |
| 2008/0005091 A1 | 1/2008 | Lawler et al. |
| 2008/0030764 A1 | 2/2008 | Zhu et al. |
| 2008/0114751 A1 | 5/2008 | Cramer et al. |
| 2008/0114875 A1 | 5/2008 | Anastas et al. |
| 2008/0147673 A1 | 6/2008 | Candea et al. |
| 2008/0147731 A1 | 6/2008 | Narayana et al. |
| 2008/0195646 A1 | 8/2008 | Meijer et al. |
| 2008/0235243 A1 | 9/2008 | Lee et al. |
| 2008/0270469 A1 | 10/2008 | Myerson et al. |
| 2008/0275951 A1 | 11/2008 | Hind et al. |
| 2008/0281809 A1 | 11/2008 | Anderson et al. |
| 2008/0294760 A1 | 11/2008 | Sampson et al. |
| 2009/0006478 A1 | 1/2009 | Rikhtverchik et al. |
| 2009/0013270 A1* | 1/2009 | Helfman et al. ............... 715/764 |
| 2009/0013287 A1* | 1/2009 | Helfman et al. ............... 715/853 |
| 2009/0049052 A1 | 2/2009 | Sharma et al. |
| 2009/0049372 A1 | 2/2009 | Goldberg |
| 2009/0070337 A1 | 3/2009 | Romem et al. |
| 2010/0070514 A1 | 3/2010 | Woodruff |
| 2010/0125505 A1 | 5/2010 | Puttaswamy |
| 2010/0169792 A1 | 7/2010 | Ascar et al. |
| 2010/0174714 A1* | 7/2010 | Asmundsson et al. ......... 707/737 |
| 2010/0332531 A1 | 12/2010 | Galande ......................... 707/770 |
| 2010/0332550 A1 | 12/2010 | Ainslie ........................... 707/802 |
| 2011/0029509 A1 | 2/2011 | Kumthekar et al. ........... 707/723 |
| 2011/0029516 A1 | 2/2011 | Chang et al. ................... 707/734 |
| 2011/0029581 A1 | 2/2011 | Zhao et al. ..................... 707/812 |

OTHER PUBLICATIONS

"9 Oracle Net," https://students.kiv.zcu.cz/doc/oracle/gateways.102/b16218/net.htm, pp. 1-6 (Publicly known at least as early as Apr. 22, 2009).

"Malaysian Public Sector Open Source Software (OSS) Program Web Application Guidelines," pp. 1-42 (Apr. 2008).

"Objectivity/HA—The High Availability Option," http://www.objectivity.com/pages/objectivity/high_availability.asp, pp. 1-5 (Publicly known at least as early as Apr. 22, 2009).

"Predictive Analysis with SQL Server 2008, White Paper," http://download.microsoft.com/download/6/9/D/69D1FEA7-5B42-437A-B3BA-A4AD13E34EF6/SQL2008PredictAnalysis.docx, pp. 1-15 (Jul. 2008).

"Rdb: Distributed Option," http://www.oracle.com/technology/products/rdb7/htdocs/fs_dist.htm, pp. 1-2 (Publicly known at least as early as Apr. 22, 2009).

"Server-side or client-side web analytics (part 2)," http://www.vdgraaf.info/server-side-or-client-side-web-analytics-part-2.html, 3 pages (Jul. 25, 2007).

"Web analytics," *Wikipedia, the free encyclopedia*, http://en.wikipedia.org/wiki/Web_analytics, 9 pages (Apr. 12, 2009).

"What Makes CardioLog Different The best SharePoint reporting solution," http://www.intlock.com/intlocksite/ProductsAndServices/CardioLog/What-Makes-CardioLog-Different.asp, pp. 1-2 (Copyright 2008).

Agichtein, E. et al., Identifying "Best Bet" Web Search Results by Mining Past User Behavior, *Proceedings of the 12th ACM SIGKDD International Conference on Knowledge Discovery and Data Mining*, Philadelphia, Pennsylvania, 7 pages (Aug. 20-23, 2006).

Bilenko, M. et al., "Mining the Search Trails of Surfing Crowds: Identifying Relevant Websites From User Activity," *Proceeding of the 17th International Conference on World Wide Web*, Beijing, China, 10 pages (Apr. 21-25, 2008).

Bruggeman, M. et al., "Exploring the Data View Web Part," http://www.lcbridge.nl/vision/2009/dvwp.htm, pp. 1-17 (Feb. 19, 2009).

Burton, M. et al., "The Value of Web Log Data in Use-Based Design and Testing," *JCMC*, vol. 6, No. 3, pp. 1-26, http://jcmc.indiana.edu/vol6/issue3/burton.html (Apr. 2001).

Chang, F. et al., "Bigtable: A Distributed Storage System for Structured Data," *OSDI 2006*, pp. 1-14 (2006).

Eckerson, W., "Federating Distributed Data," *Information Management Magazine*, http://www.information-management.com/issues/9991101/1555-1.html, pp. 1-2 (Nov. 1, 1999).

Horowitz, J. et al., "Decomposing Heterogeneous Inter-Entity Relationship Updates," *IEEE Transactions on Knowledge and Data Engineering*, vol. 4, No. 4, pp. 360-370 (Aug. 1992).

Huang, Z. et al., "A Graph Model for E-Commerce Recommender Systems," *Journal of the American Society for Information Science and Technology*, vol. 55, No. 3, pp. 259-274 (2004).

Imhof, J., "Web search enhancement based on User Behaviour Information," https://www.dbis.ethz.ch/education/ss2007/_07_dbs_algodbs/ImhofReport.pdf, pp. 1-23 (Jun. 11, 2007).

Imhoff, C., "Active Data Warehousing—The Ultimate Fulfillment of the Operational Data Store," http://www.teradata.com/t/assets/0/206/276/33b475d5-edlc-4eef-81be-51507e7c0667.pdf, pp. 1-14 (Copyright 2001).

Jones, M., "Web-based Data Management," http://www.ecoinformatics.org/pubs/guide/jones.fv2.htm, pp. 1-8 (Publicly known at least as early as Apr. 22, 2009).

Norguet, J. et al., "A Page-Classification Approach to Web Usage Semantic Analysis," *Engineering Letters*, vol. 14, 7 pages (Feb. 12, 2007).

Olamendy, J., "Distributed Database Management Systems," http://www.c-sharpcorner.com/UploadFile/john_charles/_DistributedDatabaseManagementSystems12172008141339PM/DistributedDatabaseManagementSystems.aspx, pp. 1-3 (Dec. 17, 2008).

Olszak, C. et al., "Business Intelligence Systems in the Holistic Infrastructure Development Supporting Decision-Making in Organisations," *Interdisciplinary Journal of Information, Knowledge, and Management*, vol. 1, pp. 47-58 (2006).

Qiu, F. et al., "Automatic Identification of User Interest for Personalized Search," *Proceedings of the 15th International Conference on World Wide Web*, Edinburgh, United Kingdom, 10 pages (May 22-26, 2006).

Son, L. et al., "The Visualisation of Internet Usage," *Southern African Networks and Applications Conference (SATNAC)* 2004, 6 pages (Sep. 6-8, 2004).

Strumme, G. et al., "Usage Mining for and on the Semantic Web," *Proc. NSF Workshop on Next Generation Data Mining*, Baltimore, Maryland, 10 pages (Nov. 2002).

U.S. Appl. No. 12/512,859, filed Jul. 30, 2009, entitled "Web-Usage Pattern Insight Platform".

U.S. Appl. No. 12/492,704, filed Jun. 26, 2009, entitled "Platform for Configurable Logging Instrumentation".

U.S. Appl. No. 12/512,845, filed Jul. 30, 2009, entitled "Best-Bet Recommendations".

U.S. Appl. No. 12/492,675, filed Jun. 26, 2009, entitled "Batched Transfer of Arbitrarily Distributed Data".

U.S. Appl. No. 12/512,776, filed Jul. 30, 2009, entitled "Load-Balancing and Scaling for Analytics Data".

Velayathan, G. et al., "Behavior Based Web Page Evaluation," *Proceedings of the 16th International Conference on World Wide Web*, Banff, Alberta, Canada, pp. 1317-1318 (May 8-12, 2007).

Wade, A., "Single Logical View over Enterprise-Wide Distributed Databases," *Proceedings of the 1993 ACM SIGMOD International Conference on Management of Data*, Washington, D.C., pp. 441-444 (May 26-28, 1993).

Zhu, T. et al., "Using Learned Browsing Behavior Models to Recommend Relevant Web Pages," *International Joint Conferences on Artificial Intelligence*, http://dli.iiit.ac.in/ijcai/IJCAI-05/PDF/post-0462.pdf, 3 pages (Aug. 1, 2005).

U.S. Official Action in U.S. Appl. No. 12/492,704 dated Sep. 13, 2011.

U.S. Official Action in U.S. Appl. No. 12/512,776 dated Oct. 25, 2011.

\* cited by examiner

DYNAMIC INFORMATION HIERARCHIES

Related U.S. patent application Ser. No. 12/512,859, filed on Jul. 30, 2009 entitled "Web Usage Pattern Insight Platform," assigned to the assignee of the present application, is hereby incorporated by reference.

Related U.S. patent application Ser. No. 12/492,704, filed on Jun. 26, 2009 entitled "Platform for Configurable Logging Instrumentation," assigned to the assignee of the present application, is hereby incorporated by reference.

Related U.S. patent application Ser. No. 12/512,845, filed on Jul. 30, 2009 entitled "Best-Bet Recommendations," assigned to the assignee of the present application, is hereby incorporated by reference.

Related U.S. patent application Ser. No. 12/492,675, filed on Jun. 26, 2009 entitled "Batched Transfer of Arbitrarily Distributed Data," assigned to the assignee of the present application, is hereby incorporated by reference.

Related U.S. patent application Ser. No. 12/512,776, filed on Jul. 30, 2009 entitled "Load-Balancing and Scaling for Analytics Data," assigned to the assignee of the present application, is hereby incorporated by reference.

BACKGROUND

Dynamic information hierarchies provide a data model and algorithms for organizing the data required to produce insight reports in a flexible and extensible manner. In some situations, such as an information management portal users may wish to gain rich insights of various usage patterns within the system. Users may wish to know, for example, what are the top search queries being issued, what is the most viewed content, how many document libraries exist in the system, etc. An analytics system may collect raw data and aggregate it to provide insights in the form of reports, but a key aspect of the information management portal is its dynamic nature. The system hierarchy and the insights required may change over time, and conventional systems may not be able to ensure that the system can adapt to this dynamic nature.

SUMMARY

Insights into dynamic information hierarchies may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A dynamic information hierarchy may be provided. Logging data comprising a captured user event and a component ID associated with a hierarchical node may be stored in a raw data table. The stored data may be aggregated across the nodes of the hierarchy, stored in an aggregation table, and provided to a user in a report.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
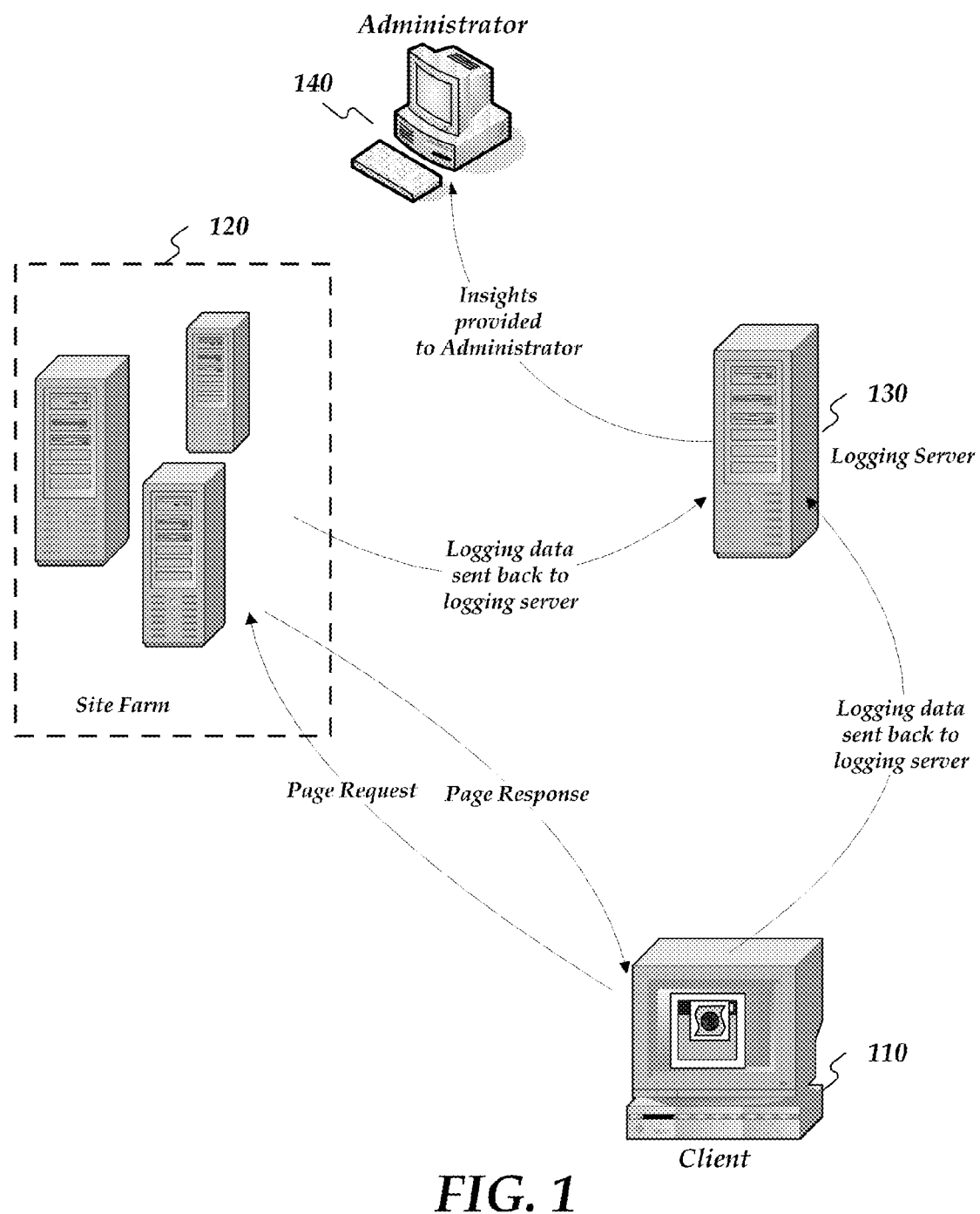
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Insights into dynamic information hierarchies may be provided. Consistent with embodiments of the present invention, a data-model may use decoupled data-structures to store hierarchy-relationship data, raw data and report-aggregation data. The aggregation data may comprise data for all nodes in the hierarchy. Changes in the hierarchy may be isolated from changes to any data-structures by inserting a new item in the existing hierarchy-relationship data-store. New report-aggregation data for the changed node may then be added to the aggregation data-stores. Changes in the required aggregations, such as for a new insight, may not require a change in any existing data-structures, just a new aggregation data-store that may aggregate data for the new insight for all nodes in the hierarchy.

FIG. 1 is a block diagram of an operating environment 100. Operating environment 100 may comprise a client 110, a web site farm 120, a logging server 130, and an administrator 150. Client 110, logging server 130, and administrator 140 may comprise, for example, a computing device 300 such as that described in greater detail below with respect to FIG. 3. Web site farm 120 may comprise one and/or a plurality of server computers each comprising a computer such as computing device 300 operative to host web pages associated with one and/or more web sites. Client 110, web site farm 120, logging server 130, and/or administrator 140 may be in communication with each other over a computing network or other communications medium. For example, client 110 may be operative to request and retrieve a web page from a web server associated with site farm 120 via the network and send captured user behaviors to logging server 130.

The retrieved web page may comprise a plurality of rendering instructions encoded in a markup language, such as HyperText Markup Language (HTML). The markup language may provide a means to describe the structure of text-based information in a document by identifying the structure of text elements as links, headings, paragraphs, lists. The markup language may also supplement the text with objects such as form controls, images, and executable scripts. Executable scripts may enable programmatic access to other objects on the page and to hardware and/or software associated with client 110. For example, a logging object may be operative to detect activities associated with user interface devices attached to client 110, such as a keyboard and/or mouse, and store the detected activity on a local storage device, such as RAM and/or a hard drive.

Logging server 130 may comprise a database operative to create, update, modify, and remove data entries associated with logging data received from site farm 120 and/or client 110. The database may comprise a schema associated with structuring the data storage. The schema may comprise the database structure as described in a formal language supported by the database management system (DBMS). In a relational database, for example, the schema may define the tables, the fields in each table, and the relationships between fields and tables.

Figure 2A:
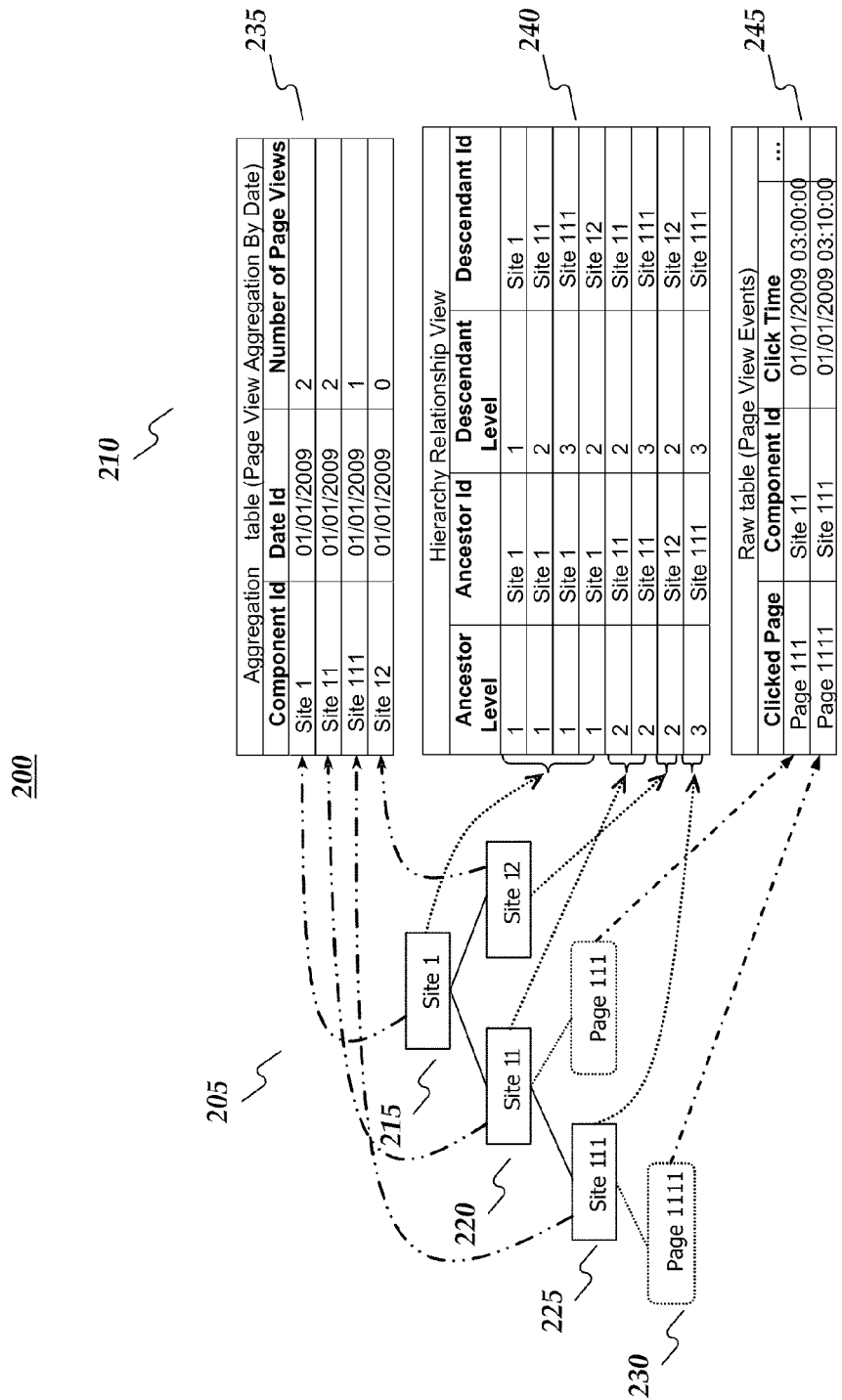
FIGS. 2A-2B are diagrams illustrating a hierarchical data model.

FIG. 2A is a diagram illustrating a hierarchical data model 200. Data model 200 may comprise a hierarchy 205 and a database 210. Hierarchy 205 may comprise a relationship view that may represent a plurality of node relationships between ancestor and descendant nodes and objects in hierarchy 205. For example, hierarchy 205 may comprise a top level node 215, a second level 220 comprising descendant nodes of top level node 215, and a third level 225 comprising a descendant node of an ancestor node in second level 220 and top level node 215. Each node of hierarchy 205 may comprise a parent object associated with other nodes and/or a plurality of monitored objects, such as an object 230.

Hierarchy 205 comprises an example only, and may comprise more and/or fewer levels with more and/or fewer nodes in each of the levels. For example, object 230 may comprise a single page comprising a support document. Object 230 may be associated with a site comprising a collection of support documents, and the site may be represented by an ancestor node in third level 225. The collection of support documents may be associated with a web-application, such as a search engine operative to index the collection of support documents, and may be associated with an ancestor node in second level 220. The web-application may be associated with site farm 120 and may be represented by top level node 215. Top level node 215 may be associated with a plurality of descendant nodes comprising single pages, sites, sub-sites, applications, and/or any other object associated with site farm 120. Consistent with embodiments of the invention, each node of hierarchy 205 may comprise a unique component ID.

Database 210 may comprise a plurality of tables such as an aggregation table 235, a relationship view 240, and a data table 245. Relationship view 240 may comprise a logical rather than a physical table; it may comprise a view of a physical relationship table that may be stored in nested set data structure. This may make it easier to maintain the hierarchy and may save storage space by storing only one row for each node in the hierarchy by using nested set data structure or adjacent link structure. Relationship view 240 may be derived from the physical relationship table.

Hierarchy 205 may be represented by relationship view 240 that may store a list of nodes comprising each node's relationship to other nodes of hierarchy 205. Relationship view 240 may store the hierarchy nodes in a data structure such as a nested set and/or an adjacent link structure. Relationship view 240 may comprise, for example, a plurality of columns comprising an ancestor level, an ancestor ID, a descendant level, and a descendant ID. Each node of hierarchy 205 may have an entry in relationship view 240 for itself and/or each of its each descendant nodes.

In example hierarchy 205, top level node 215 may comprise a unique component ID of "Site 1" and may have three descendant nodes comprising unique component IDs of "Site 11, " "Site 12, " and "Site 111." Site 11 and Site 12 may comprise immediate descendant nodes of Site 1 and Site 111 may comprise an immediate descendant node of Site 11.

Relationship table 240 may thus comprise four entries associated with top level node 215 ("Site 1"). One entry may comprise the descendant ID and the ancestor ID both being set to the unique component ID of top level node 215 itself with a descendant level of 1, indicating that top level node 215 has no ancestor nodes. Other entries in relationship table 240 for top level node 215 may comprise entries for each descendant node in hierarchy 205 (e.g. Site 11, Site 111, and Site 12). Thus, an entry comprising the relationship of Site 1 to Site 11 may comprise Ancestor Level of 1, Ancestor ID of Site 1, Descendant Level of 2, and Descendant ID of Site 11. Similarly, an entry comprising the relationship of Site 1 to Site 111 may comprise Ancestor Level of 1, Ancestor ID of Site 1, Descendant Level of 3, and Descendant ID of Site 111. Relationship table 240 may similarly comprise two entries associated with the Site 11 node, one for the node itself and one for the Site 111 node, the only descendant node of Site 11.

Thus, for each entry in relationship view 240, the descendant level may comprise a number associated with the level of the hierarchy with which the descendant node is associated. For nodes associated with second level 220, the descendant level may comprise 2 while nodes associated with third level 225 may comprise a descendant level of 3.

Consistent with embodiments of the invention, monitored objects may comprise individual objects associated with nodes of site farm 120 for which user interactions are logged. For example, in hierarchy 205, object 230 may comprise a single web page with a unique component ID of "Page 1111" for which site farm 120 counts a number of page views. A page view of the web page associated with lowest object 230 may be represented by an entry in data table 245 comprising an identifier associated with the web page, the component ID associated with the web page's immediate ancestor node, and any additional data associated with the logging event, such as a date/time, a user ID associated with the page request, a browser session ID, any parameters associated with the page request, etc.

Data for nodes in hierarchy 205 may be aggregated by a query that may join data table 245 and relationship table 240. For example, data may be aggregated by joining rows where the Component Id column of data table 245 equals the Descendant Id column of relationship table 240 and grouping by the Ancestor Id column of relationship table 240. The results of the join may be inserted into aggregation table 235. For example, data table 245 may comprise two entries—one page view for Page 111 and one page view for Page 1111. By performing the join query above, aggregation table 235 may comprise entries showing the number of page views associated with each node of hierarchy 205. Site 12 thus has 0 page views, Site 111 has 1 page view from the view of associated object Page 1111, and Site 11 has 2 total page views, one from Page 1111 associated with Site 11's descendant node Site 111, and one from its own associated object, Page 111. The entry for Site 1 similarly shows the two total page counts for all objects associated with any of its descendant nodes.

Aggregation table 235 may comprise an example only, and aggregation tables may be created for any data gathered for objects associated with hierarchy 205. For example, to get the number of page views per day, the aggregation may group by the Ancestor ID column of relationship table 240 and the Click Time column and count the number of rows for each distinct combination where the Date ID comprises the same day. The results may be inserted into aggregation table 235 and/or a second aggregation table.

Consistent with embodiments of the invention, users may wish to retrieve data for only some of the nodes in hierarchy 205. Aggregation table 235 may thus be queried for a given component ID with and/or without other filters (e.g. dates, minimum data values, etc) and display the results to a requesting user. The user may aggregate data for only some of the nodes in hierarchy 205 by using the node level in the hierarchy relationship table. For example, the user may request an aggregation of data for the nodes between levels 1 and 3. This may be useful for reducing the data volume in the aggregation table when the performance is poor because there is too much data in the aggregation table.

Any changes in hierarchy 205 or the type data reports requested by users thus may not cause a change to existing data-structures and any reporting applications because any raw data may be logged for new nodes in data table 245 and the structure of hierarchy 205 may be decoupled in relationship table 240. For example, a new page having a unique component ID of "Page 121" could be added to site farm 120. Data may be logged to data table 245 associated with the page's parent node of Site 12. Because the Component ID of Site 12 maps to an entry in relationship table 240, the aggregation process may require no reconfiguration—it may join on the known Component ID of the parent node and report any logged data.

Figure 2B:
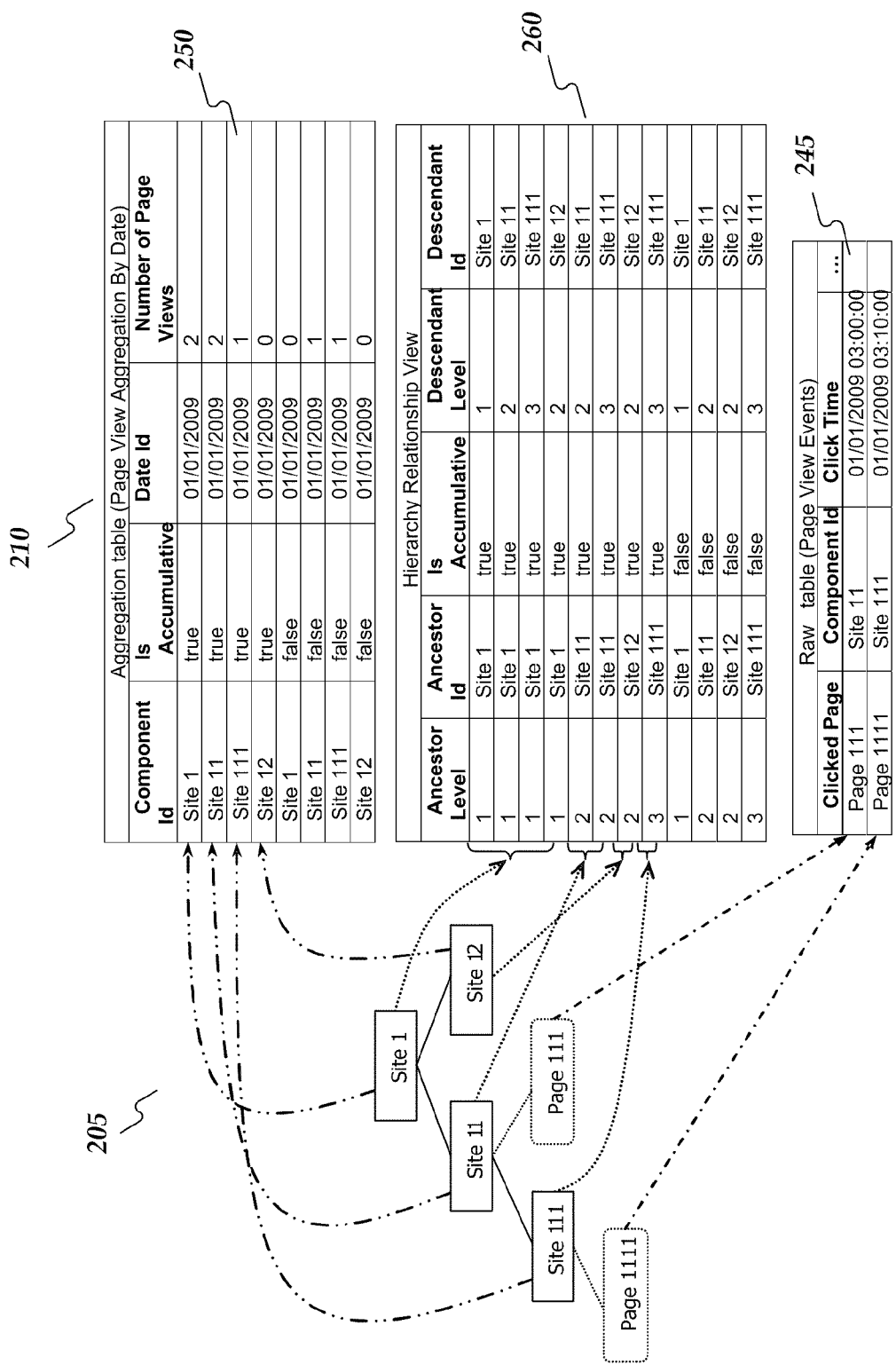

Consistent with further embodiments of the invention, non-accumulative aggregation may be provided by adding a column (e.g. "IsAccumulative") to relationship view 240 and/or aggregation table 235. For example, FIG. 2B illustrates a second aggregation table 250 and a second relationship view 260 each comprising an "IsAccumulative" column. This column may comprise a Boolean data type (i.e. "true" or "false"). Second relationship view 260 may comprise any and/or all of the existing data in relationship view 240 with an additional column IsAccumulative set to true and may comprise more self node mappings with IsAccumulative set to false. Upon aggregation for entry into second aggregation table 260, the join may include this column to group by. For example, Site 11 may have another self mapping row in second relationship view 260 for non-accumulative aggregation with Ancestor Level=2, Ancestor Id=Site 11, Descendant Level=2, Descendant Id=Site 11 and IsAccumulative=false. There may be another row in second aggregation table 250 with Component Id=Site 11, IsAccumulative=false, Date Id=01/01/2009 and Number of Page Views=1 because there is only one page view on Page 111 which is directly associated with Site 11. The page view on Page 1111 may be indirectly associated with the descendant node Site 111 of Site 11, so it may not be counted for non-accumulative aggregation.

Figure 3:
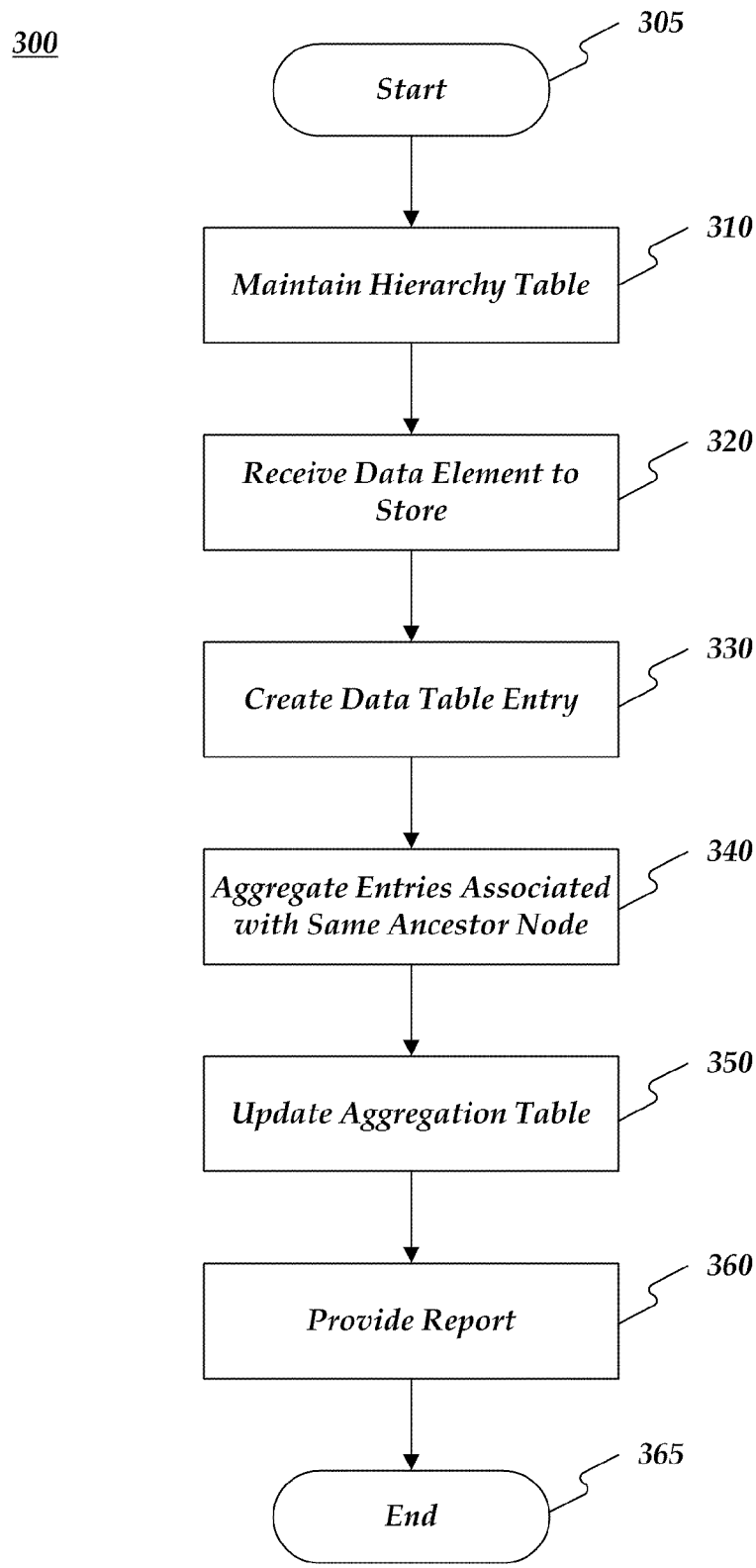
FIG. 3 is a flow chart of a method for providing insights into dynamic information hierarchies.

FIG. 3 is a flow chart setting forth the general stages involved in a method 300 consistent with an embodiment of the invention for providing a dynamic information hierarchy. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may maintain a hierarchy table. For example, logging server 130 may maintain a hierarchy table such as relationship table 240 comprising entries associated with a hierarchy of nodes. Each of the hierarchical nodes may be associated with a collection of objects, such as a site farm, a web-application, a site collection, a site, a sub-site, and/or a web page.

From stage 310, method 300 may advance to stage 320 where computing device 400 may receive a data element to store. For example, logging server 130 may receive a captured user behavior from site farm 120 or client 110. The data element may be associated with an object, such as a web page, and may comprise an identifier associated with a parent node of the object. Each parent node may comprise one and/or multiple objects, such as a web site node comprising a plurality of individual pages.

Method 300 may then advance to stage 330 where computing device may create a data table entry associated with the received data element. For example, the entry may comprises an identifier associated with the web page, the identifier associated with the parent node, and at least one property associated with the captured user behavior, such as a time of a page view.

From stage 330, where computing device 400 created the data table entry, method 300 may advance to stage 340 where computing device 400 may aggregate entries associated with the same ancestor node. For example, logging server 130 may count entries associated with a first descendant node and a second descendant node that are descendants of the same ancestor node. The counts may be added together to identify a total count of data elements associated with objects under the ancestor node in the hierarchy. Consistent with embodiments of the invention, aggregating the counts may comprise performing a database table join between the data table and the hierarchy table on a common element such as an identifier associated with the parent node of the object.

Method 300 may then advance to stage 350 where computing device 400 may update an aggregation table. Logging server 130 may create and/or update a table row associated with each node in the hierarchy and the associated data element. For example, a third level node may be associated with two web page objects, each with five page load counts. A first entry in the aggregation table may show a total count of 10 page loads associated with the third level node. A second level node comprising an ancestor node of the third level node may be associated with another web page object having 7 page load counts in the data table. A second entry in the aggregation table may thus show a total count of 17 page loads associated with the second level node.

From stage 350, method 300 may advance to stage 360 where computing device 400 may provide a report to a user. For example, administrator 140 may request a report comprising page counts for a subset of nodes for a 48 hour period. Logging server 130 may determine whether an existing aggregation table comprises such data and return it directly, such as via a web page report. Otherwise, logging server 130 may repeat the aggregation of stage 350, adding the requested time range as a restriction to the table join. The report comprising the data from the aggregation table may be provided to administrator 140 and/or client 110 and method 300 may then end at stage 360.

An embodiment consistent with the invention may comprise a system for providing a dynamic information hierarchy. The system may comprise a memory storage and a processing unit coupled to the memory storage. The processing unit may be operative to store a plurality of data in a data table, wherein each of the plurality of data is associated with an object identifier and a parent identifier, and aggregate the plurality of data into an aggregation table according to the parent identifier. The system may be operative to create and/or update multiple aggregation tables, wherein each aggregation table is associated with a different data element.

Another embodiment consistent with the invention may comprise a system for providing a dynamic information hierarchy. The system may comprise a memory storage and a processing unit coupled to the memory storage. The processing unit may be operative to receive a data element comprising a captured user event and a component ID, insert the data element into a data table comprising a plurality of data elements, and aggregate the plurality of data elements according to the component ID associated with each of the data elements. Consistent with embodiments of the invention, the system may be operative to receive data elements associated with newly created objects without any configuration changes to the system. For example, logging data associated with a newly created web page may be received by the system because it may be associated with a component ID associated with the hierarchy of nodes. New nodes may be added, removed, and/or updated in the hierarchy by the creation, deletion, and/or modification of rows in a hierarchy table without the need to change the database schema or table structure.

Yet another embodiment consistent with the invention may comprise a system for providing a dynamic information hierarchy. The system may comprise a memory storage and a processing unit coupled to the memory storage. The processing unit may be operative to maintain a hierarchy table comprising a plurality of rows each associated with one of a plurality of nodes. Each of the plurality of hierarchical nodes may be associated with a site farm, a web-application, a site collection, a site, a sub-site, and/or a web page. Each node of the hierarchy may comprise a hierarchical level and may be associated with an ancestor and/or a descendant node. The system may be further operative to receive a data element associated with a web page comprising a captured user behavior and an identifier associated with the parent node of the web page and create an entry in a data table for the received data element. The system may be further operative to aggregate the data stored in the data table according to the identifiers of the nodes associated with the received data, associate data from descendant nodes with their ancestor nodes, and update an aggregation table with the aggregated data. The system may then provide a report to a user according to a user-defined criteria, such as a particular data type, a time/date range, and/or a limited subset of the hierarchical nodes.

Figure 4:
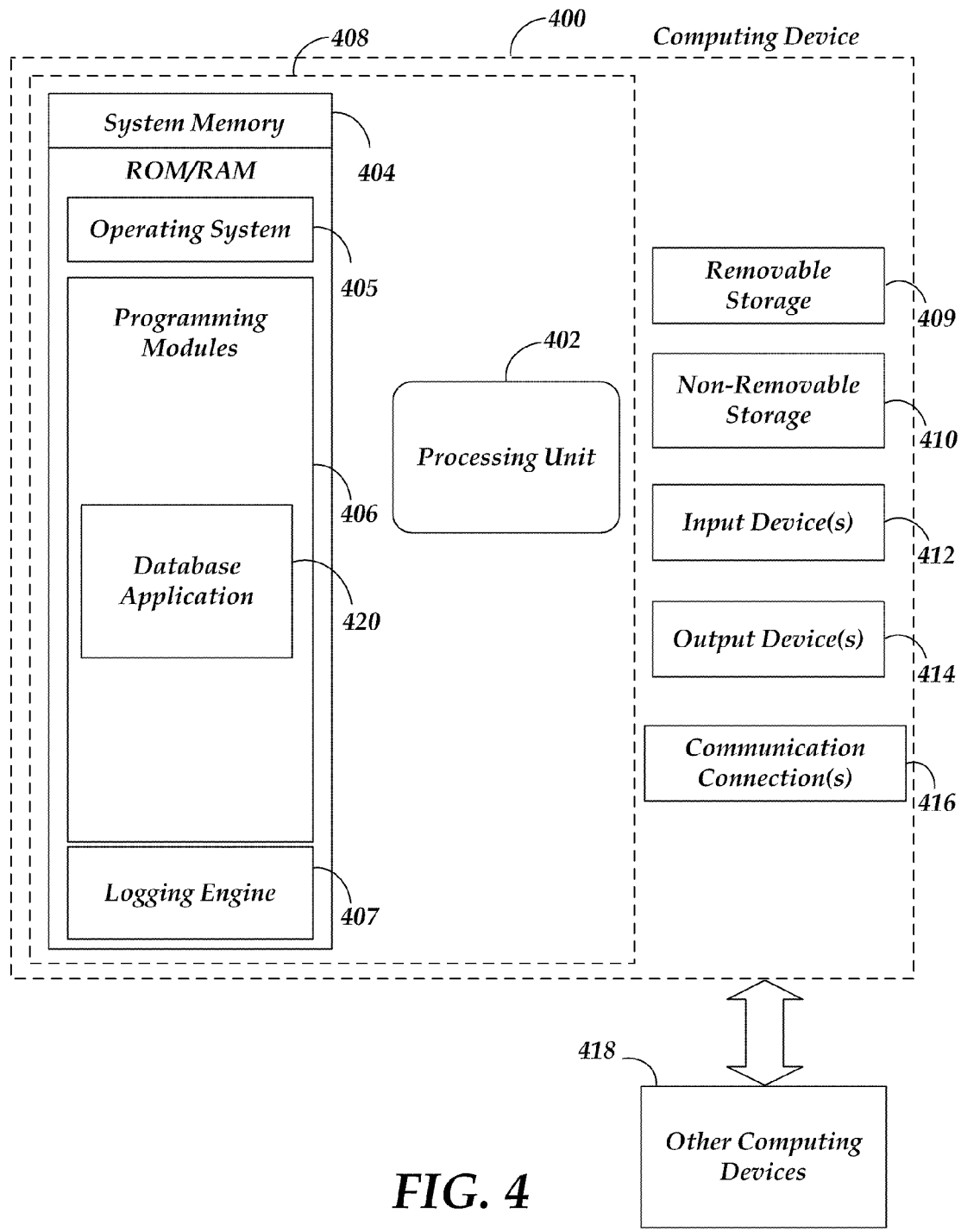
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a logging engine 407. Operating system 405, for example, may be suitable for controlling computing device 400's operation. In one embodiment, programming modules 406 may include a database application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. database application 420) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a dynamic information hierarchy, the method comprising:

creating a hierarchy table comprising a plurality of entries associated with a plurality of hierarchical nodes, wherein each of the plurality of hierarchical nodes comprises a unique component identifier and wherein at least one first node of the plurality of hierarchical nodes is associated with an entry in the hierarchy table identifying a level of the at least one first node and wherein at least one second node of the plurality of hierarchical nodes is associated with an entry in the hierarchy table identifying the at least one second node as a descendant of the at least one first node;

receiving a plurality of logging data associated with the at least one second node, wherein the plurality of logging data comprises at least one captured user behavior and the unique component identifier associated with the at least one second node;

storing the plurality of logging data as entries in a data table, wherein each of the plurality of logging data is associated with a unique identifier and an ancestor identifier of an ancestor node as defined in the hierarchy table;

aggregating the plurality of logging data into entries in an aggregation table according to the ancestor identifier wherein aggregating the plurality of logging data comprises aggregating a count of entries in the data table associated with the at least one second node into a count of entries associated with the at least one first node; and providing an aggregation report to a display device, wherein the aggregation report comprises at least one entry from the aggregation table.

2. The method of claim 1, wherein the at least one second node comprises a web page.

3. The method of claim 2 wherein the unique identifier is associated with the web page.

4. The method of claim 1, wherein the unique identifier of at least one of the plurality of hierarchical nodes comprises the ancestor identifier of the ancestor node.

5. The method of claim 1, wherein at least one of the plurality of hierarchical nodes of the hierarchy table comprises a top level node and wherein each of others of the plurality of hierarchical nodes comprises a descendant node of the top level node.

6. The method of claim 5, wherein each of the plurality of hierarchical nodes in the hierarchy table comprises data associated with an ancestor level, an ancestor ID, a descendant level, and a descendant ID.

7. The method of claim 1, wherein aggregating the plurality of logging data into entries in an aggregation table according to the ancestor identifier comprises creating an entry in the aggregation table for at least one of the plurality of hierarchical nodes comprising data associated with at least one descendant node associated with the at least one of the plurality of hierarchical nodes.

8. The method of claim 1, further comprising aggregating the plurality of logging data into a plurality of aggregation tables, wherein each of the plurality of aggregation tables is associated with a category associated with at least one element of the plurality of logging data.

9. The method of claim 1, further comprising aggregating the plurality of logging data into the aggregation table at a configurable time interval.

10. A non-transitory computer-readable medium which stores a set of instructions which when executed performs a method for providing a dynamic information hierarchy, the method executed by the set of instructions comprising:
receiving at least one data element, wherein the at least one data element comprises a captured user event and a component ID associated with at least one first node of a plurality of hierarchical nodes and wherein each of the plurality of hierarchical nodes is associated with a hierarchy level defined in a hierarchy table;
creating an entry associated with the at least one data element in a data table comprising a plurality of data elements, wherein the entry comprises the component ID associated with the at least one first node and at least one property associated with the captured user event;
aggregating the plurality of data elements according to the component ID associated with each of the plurality of data elements, wherein aggregating the plurality of data elements according to the component ID associated with each of the plurality of data elements comprises:
counting each of the plurality of data elements associated with the at least one first node and the captured user event, and
inserting the count associated with the at least one first node and the captured user event in an aggregation table associated with a second node comprising an ancestor node of the at least one first node according to the hierarchy level;
counting each of the plurality of data elements associated with a subset of the plurality of hierarchical nodes and the captured user event, wherein each of the subset of the plurality of hierarchical nodes comprises a descendant node of the ancestor node, and
inserting the count associated with the subset of the plurality of hierarchical nodes and the captured user event in an entry in the aggregation table associated with the ancestor node; and
providing an aggregation report, wherein the report comprises at least one entry from the aggregation table.

11. The computer-readable medium of claim 10, further comprising:
determining whether at least one node of the subset of the plurality of hierarchical nodes comprises a non-accumulation property; and
in response to determining that the at least one node of the subset of the plurality of hierarchical nodes comprises the non-accumulation property, skipping the at least one node of the subset of the plurality of hierarchical nodes comprising the non-accumulation property in the count associated with the subset of the plurality of hierarchical nodes.

12. The computer-readable medium of claim 10, further comprising adding an entry to the hierarchy table associated with a new node.

13. The computer-readable medium of claim 10, wherein at least one node of the plurality of hierarchical nodes comprises a collection of user-accessible web objects.

14. A system for providing a dynamic information hierarchy, the system comprising:
a memory storage; and
a processing unit coupled to the memory storage, wherein the processing unit is operative to:
maintain a hierarchy table comprising a plurality of entries associated with a plurality of hierarchical nodes, wherein each of the plurality of hierarchical nodes is associated with at least one of the following: a site farm, a web-application, a site collection, a site, a sub-site, and a web page and wherein at least one first node of the plurality of hierarchical nodes is associated with an entry in the hierarchy table identifying a level of the at least one first node and an entry in the hierarchy table identifying at least one second node of the plurality of hierarchical nodes as a descendant of the at least one first node;
receive a data element associated with a web page comprising a captured user behavior and an identifier associated with the at least one second node, wherein the web page comprises one of a plurality of objects associated with the at least one second node;
create an entry in a data table associated with the received data element, wherein the entry in the data table comprises an identifier associated with the web page, the identifier associated with the at least one second node, and at least one property associated with the captured user behavior;
count a number of entries in the data table associated with the at least one second node;
count a number of entries in the data table associated with at least one third node, wherein the at least one third node comprises a descendant node of the at least one first node;
aggregate the count of entries associated with the at least one second node and the at least one third node into a count of entries associated with the at least one first node;
update an aggregation table with a first entry comprising the count of entries associated with the aggregated count of entries associated with the at least one first node, a second entry comprising the count of entries associated with the at least one second node, and a third entry comprising the count of entries associated with the at least one third node; and
provide a report to a user, wherein the report comprises at least one entry from the aggregation table according to a user-defined criteria.

* * * * *